Aug. 31, 1965

H. H. HOFFMAN

3,203,050

SHOE LAST STRUCTURE FOR THE MANUFACTURE
OF PLASTIC SOLES UPON SHOE UPPERS

Filed Jan. 8, 1963

INVENTOR

HOWARD H. HOFFMAN

BY Rommel, Allwine & Rommel

ATTORNEYS

Aug. 31, 1965  H. H. HOFFMAN  3,203,050
SHOE LAST STRUCTURE FOR THE MANUFACTURE
OF PLASTIC SOLES UPON SHOE UPPERS
Filed Jan. 8, 1963  8 Sheets-Sheet 2

INVENTOR
HOWARD H. HOFFMAN
BY Rommel, Allison ay Rommel
ATTORNEYS

Aug. 31, 1965

H. H. HOFFMAN

3,203,050

SHOE LAST STRUCTURE FOR THE MANUFACTURE
OF PLASTIC SOLES UPON SHOE UPPERS

Filed Jan. 8, 1963

INVENTOR

HOWARD H. HOFFMAN

BY
ATTORNEYS

Aug. 31, 1965    H. H. HOFFMAN    3,203,050
SHOE LAST STRUCTURE FOR THE MANUFACTURE
OF PLASTIC SOLES UPON SHOE UPPERS
Filed Jan. 8, 1963    8 Sheets-Sheet 4

INVENTOR

HOWARD H. HOFFMAN

BY *Rommel, Allwine and Rommel*

ATTORNEYS

INVENTOR
HOWARD H. HOFFMAN
BY
ATTORNEY

Aug. 31, 1965  H. H. HOFFMAN  3,203,050
SHOE LAST STRUCTURE FOR THE MANUFACTURE
OF PLASTIC SOLES UPON SHOE UPPERS
Filed Jan. 8, 1963  8 Sheets-Sheet 8

INVENTOR
HOWARD H. HOFFMAN
BY
ATTORNEYS

United States Patent Office 3,203,050
Patented Aug. 31, 1965

3,203,050
SHOE LAST STRUCTURE FOR THE MANUFACTURE OF PLASTIC SOLES UPON SHOE UPPERS
Howard H. Hoffman, Nashville, Tenn., assignor to Southern Shoe Machinery Company, Nashville, Tenn.
Filed Jan. 8, 1963, Ser. No. 250,082
7 Claims. (Cl. 18—46)

In the art of shoe manufacture, using conventional vulcanizing and injection machines, it has been impossible to economically manufacture high grade shoes using an upper having steel, fiber or wood shanks at the arch because of the difficult application and removal of the upper with respect to the last. One conventional last mainly consists of a base having an integral toe or block section, and a heel block or section slidable thereon; the heel section being slidable along an arcuate path on the base. Movement of the heel section with respect to the toe section during opening of the last causes the distance between the heel section and the toe section to be reduced. Since the toe section is fixed to the base of the last, distortion of the shoe upper occurs at the shank region of the upper, when the last is opened, and if the upper has a rigid shank it will be distorted, or injured with resultant displacement of the sole margins of the upper at the shank region. One such last is shown in U.S. Patent 2,277,769. It is therefore a purpose of the present invention to provide an improved last having a base with an intermediate block and articulated toe and heel sections or blocks so constructed and arranged as to permit easy application and removal of the shoe upper without longitudinal distortion or even flexing throughout the length of the sole.

The conventional type of last above described is satisfactory for the molding of soles and heels on canvas or cloth uppers, because of the absence of steel, wood or fiber shanks, since the flexing of the upper is unimportant.

It is a further object of the present invention to provide an improved last for use with injection and molding machines, whereby the operator is relieved of preventing distortion of the shoe upper along its length, both during application of the upper to the last and for its removal therefrom.

Other objects and advantages of this invention will be apparent during the course of the following detailed description.

In the accompanying drawings, forming a part of this specification, and wherein similar reference characters designate corresponding parts throughout the several views.

Figure 12:
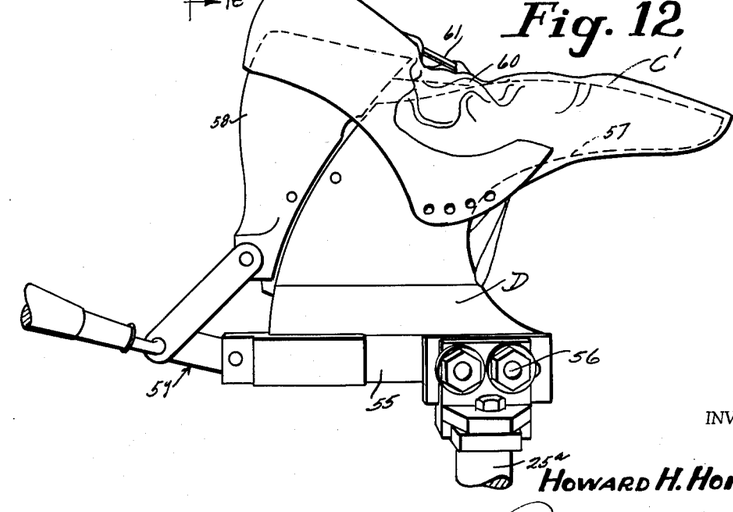
FIGURE 12 is a view of a conventional last having a non-pivoted toe section and showing how the action of such last will distort a shoe upper and break down the shoe upper in the shank region.

In the drawings, wherein for the purpose of illustration is shown only a preferred embodiment of the invention, the letter A may generally designate a machine for applying plastic soles and heels upon shoe uppers and which includes the improved lasts B, whereby the upper C can be manipulated upon the machine for placement and removal of the same without distortion or bending throughout the sole area. In FIG. 12 is shown a conventional type of last structure D and note the distortion of the shoe upper C' thereon during opening manipulation of the last sections.

The machine or apparatus A is of a type adapted to rotatably support the improved last or a plurality of the same for the placement and removal of shoe uppers with respect thereto; the machine including a mold wherein an elastic rubbery-type of synthetic plastic such as "Plastisole" is used in an injecting molding process, or upon which a vulcanized sole and heel structure may be applied to the shoe upper.

Figure 1:
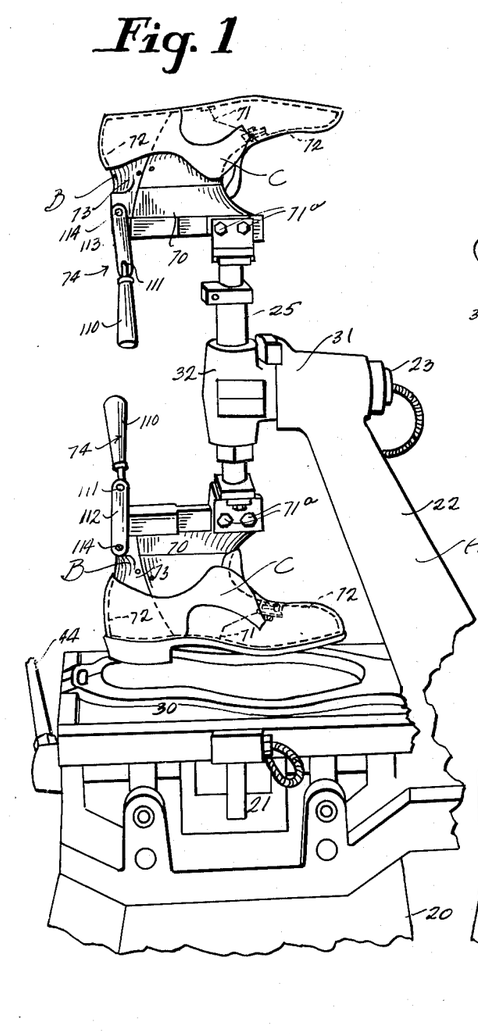
FIGURE 1 is a fragmentary side elevation of a sole molding machine showing the improved lasts associated therewith for the support of uppers of shoes and the manipulation thereof for the purpose of application of soles and heels through vulcanizing or the injecting molding thereof; the last being shown without an upper and out of molding position.
Figure 2:
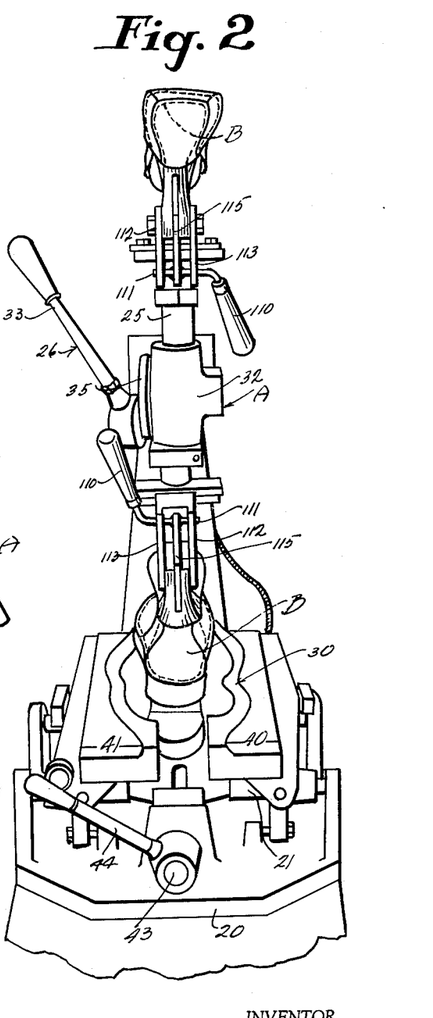
FIGURE 2 is a fragmentary perspective rear elevation of the machine shown in FIG. 1 showing the mold parts opened.
Figures 3, 4:
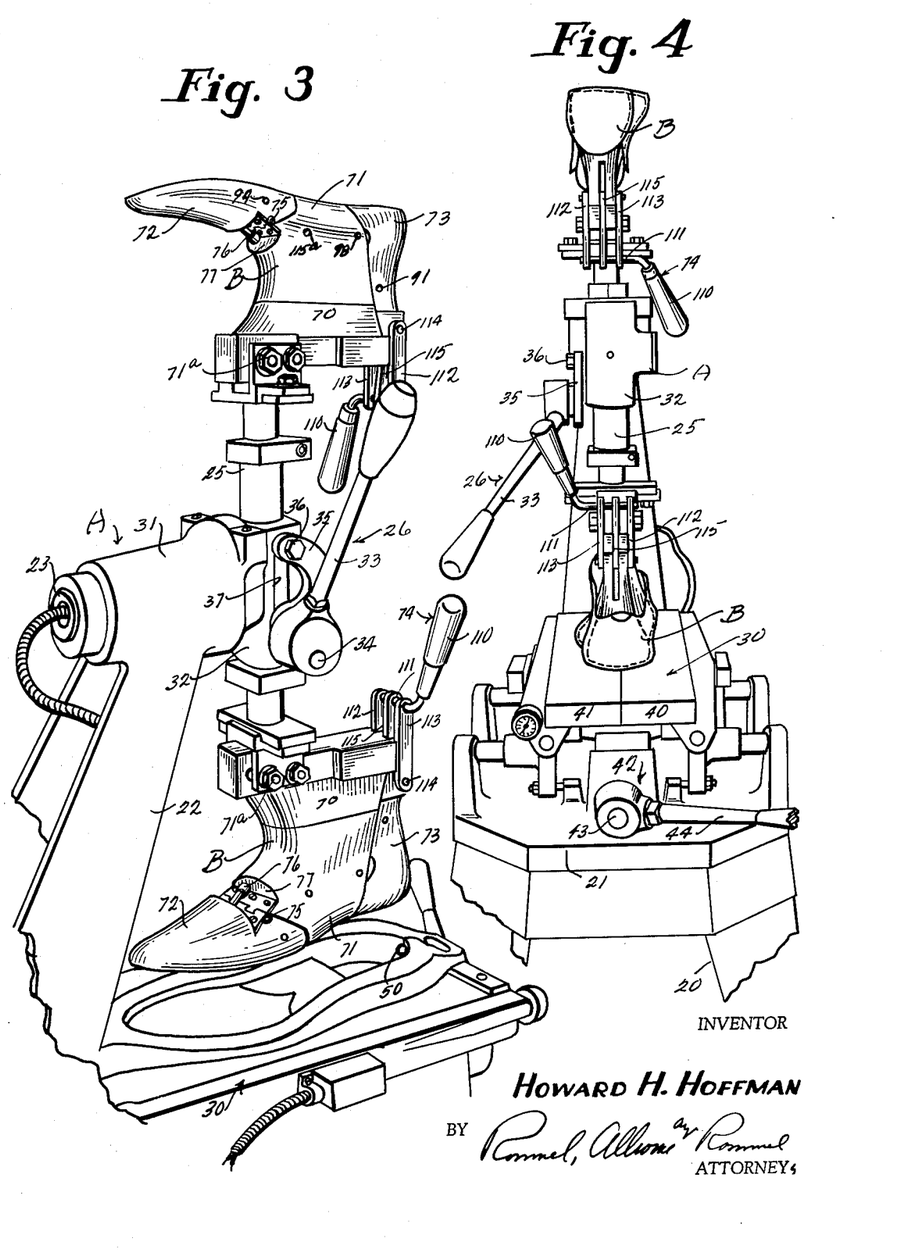
FIGURE 3 is a perspective view of the machine and last showing the machine with a last out of molding position upon the machine (without an upper thereon).
FIGURE 4 is a perspective rear elevation showing the improved last structure as mounted upon a machine with the last lowered in the mold and the parts of the mold closed.
Figures 5, 15, 16:
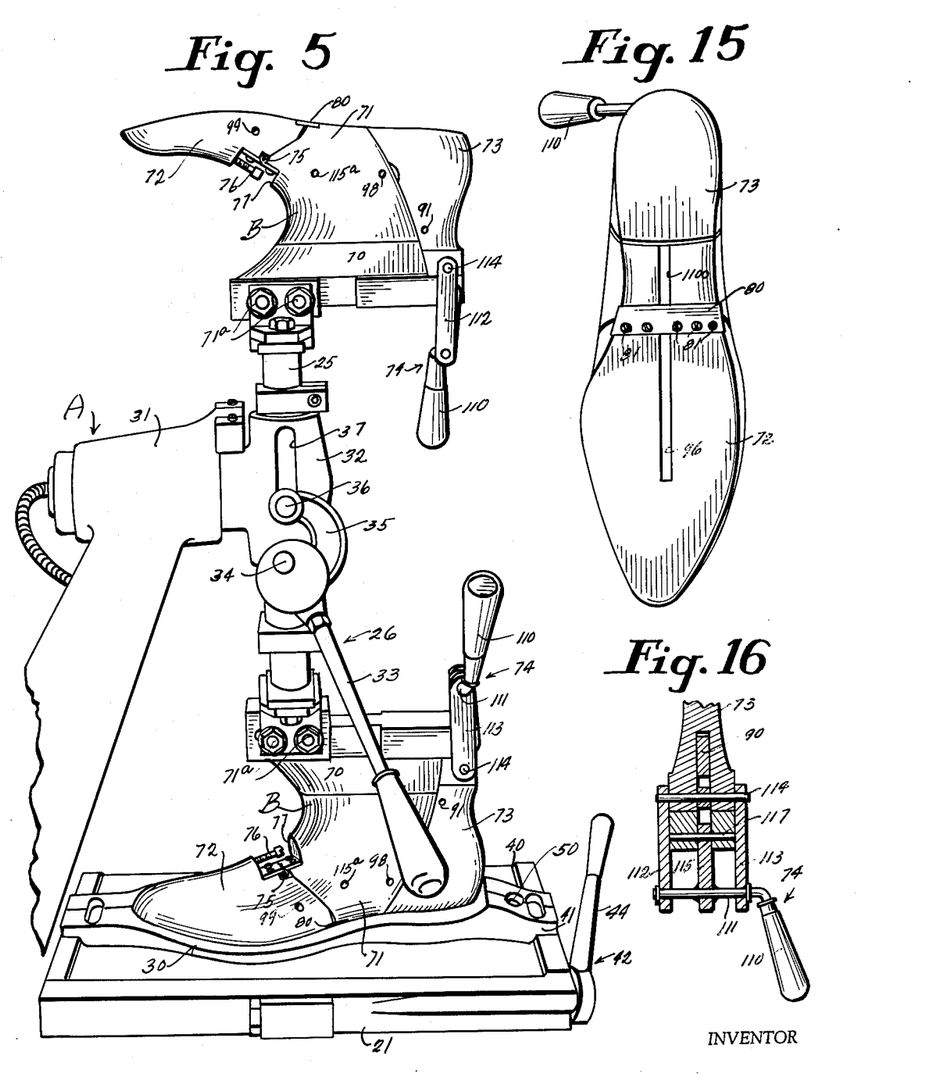
FIGURE 5 shows a side elevation of the improved last as mounted on the machine with the bottommost last resting in the closed mold.
FIGURE 15 is a bottom plan view of the last showing the sections thereof when in closed relation.
FIGURE 16 is a cross sectional view taken through the leverage operating mechanism which manipulates the last sections, the view being taken substantially on the line 16—16 of FIG. 11.
Figure 6:
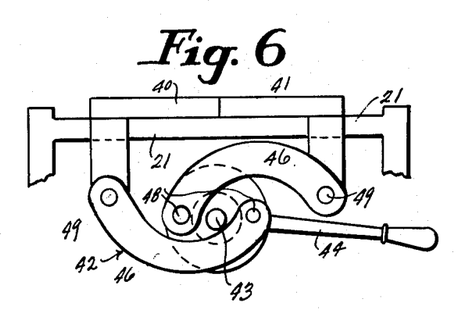
FIGURES 6 and 6A are views showing conventional mechanism for manipulating the mold parts of the machine.
Figure 6A:
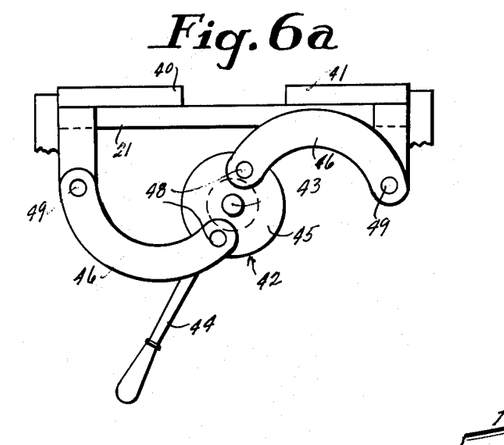
Figure 6B:
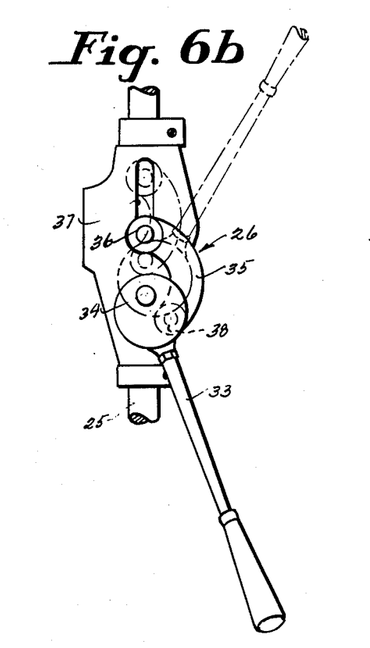
FIGURE 6B is a fragmentary view of the operating mechanism for moving the lasts relative to molding parts.

Generally the machine A includes a stationary frame 20 having a base portion 21 from which arises a standard 22. The standard 22 has a sleeve 31 which supports a horizontal rotatable shaft 23. The latter has a head sleeve 32 adapted to slidably receive a shaft 25 upon the outer ends of which may be mounted the improved lasts B. Operating means 26 (see FIG. 3) is provided on the sleeve or head portion 24 for reciprocating the shaft 25 by means of which it may be elevated and lowered with respect to a mold 30 carried by the base 21. The operating means 26 to reciprocate the shaft 25 comprises a lever 33 pivoted at 34 on the shaft sleeve 32; the same having a link 35 eccentrically pivoted thereto at 38 (see FIG. 6B) which is connected at 36 to the shaft 25. The sleeve 32 is slotted at 37 to permit play of pin 36. It is obvious that upon turning of the lever 33 the shaft 25 will be reciprocated through the sleeve 32 for the purpose of elevating and lowering the last B with respect to mold 30. FIG. 3 shows the last elevated with respect to the mold and FIG. 5 shows it lowered in the mold.

The mold 30 comprises a pair of mold sections 40 and 41 slidably supported upon the base 21. Mold sections 40 and 41 have mold depressions as shown in FIG. 3 and elsewhere and are laterally movable towards and away from each other by an operating means generally indicated at 42 (see FIGS. 6 and 6A) which may consist of a shaft 43 rotatably mounted on the base 21 of the machine having an operating lever 44 for the turning thereof. The shaft 43 has rigidly affixed thereto a ring-shaped portion 45. Links 46 and 47 are eccentrically connected to the ring-shaped portion 45 at 48, and diametrically opposite to the axis of the shaft 43. The links 46 and 47 at their outer ends are connected at 49 to the mold sections 40 and 41. It is readily obvious that the mold sections may be moved by this leverage and link mechanism into proximity to provide a mold for the plastic material, or moved apart to permit the detachment of the last and its upper after the molding of the sole and heel on the shoe upper.

The mold depression may receive plastic to be vulcanized to the upper, or in an injection type of machine the synthetic plastic in fluid form is injected into the mold through an opening 50 in a manner well understood in the art.

Different types of machines for forming of plastic soles on uppers may be utilized. Another such type is shown in U.S. Patent 3,018,517.

In FIG. 12 is shown a conventional type of last D. It includes a base portion 55 detachably secured at 56 on an arm 25ª, similar to the arm 23 of the machine above described. This base 55 includes a toe section 57 integral with the base 55 and a heel section 58 movable arcuately with respect to the base 55 by the lever means 59. The disadvantage, as above mentioned, of last D is that the upper C' either upon application or removal of the shoe upper with respect to the last is necessarily distorted at the shank area as shown at 60 and resulting in the bending or possible fracture of the shank 61 and loosening of the upper innersole margins.

The improved last B has been provided to overcome shoe upper distortion either upon application of the shoe upper upon the last or incidental to removal of the completed shoe from the last after the sole and heel have been molded thereto. This last structure B, is well shown in FIGS. 13, 14 and 17, preferably comprises a base 70 which is detachably secured at 71ª to an outer end of the arm or shaft 25; the base 70 including an integral rigid intermediate last block or section 71, a unitary one piece toe block or section 72 pivotally connected to the base 70 and a unitary one piece heel block or section 73 movably connected to the base 70, intermediate section 71 and the toe section 72. Manipulations of the movable sections of the last B are effected through a leverage mechanism 74.

The toe section 72 of the last B is a complete unitary toe block comprising integral sole portion and instep portion. It is pivoted at 75 to a portion of the intermediate section 71 so that the entire toe of the last will pivot from a closed position on the last to an opened position and vise versa. An adjustable stop screw 76 may be located on the toe section 72 adapted to engage a shoulder 77 on the rigid or intermediate portion 71 of the last to limit the opened position or the degree of swing of the toe section with respect to the base of the last. The intermediate section 71 comprises a part of the block area and curves in the normal area of the arch of the foot represented by the last and it will be noted that a plate or flange 80 is provided on the toe section 72, secured by screws 81, see FIG. 15, adapted to engage in a recess 82 provided in the intermediate porton 71; this flange plate 80, when the last is closed, as shown in FIG. 13, overlying the juncture of the toe portion 72 with the intermediate portion 71.

The heel section 73 in a compact unitary heel block has an arcuate sliding movement with respect to the base 70 and intermediate section 71 of the last; the base 70 and intermediate portion 71 being formed with a convex arcuate surface 85 and the facing surfacing of the heel section 73 being concavely arcuate at 86 so that as the heel section 73 moves outwardly to an opened position the effective length of the last will be reduced, or extended as the last is closed. A thin link 90 is provided, having a fixed pivot pin 91 on the heel section 73; the latter being slotted at 92 to receive the link 90. The link structure 90 lies entirely within the outer confines of the last sections 71, 72 and 73. Its forwardly extending tongue 92 is provided with a diagonal slot 93 in the front end thereof which receives a pin 94 mounted in fixed relation crosswise in the rear portion of the toe section of the last. The tongue portion 92 slides within a slot 96 in the toe section 72. The intermediate portion of the link 90 between the slot 93 and the pin 91 is provided with an arcuate slot 97 which generally follows the contour of the arc of movement of the heel section 73 upon the base of the last. A pin 98 is transversely secured through the intermediate portion or base 70 of the last, crossing through the slot 97. The intermediate section 71 of the last is slotted at 100 to accommodate the link 90, as shown in FIG. 14 and elsewhere.

Referring to the leverage mechanism 74 the same is conventional, including a bell-crank lever 110, shown best in FIG. 16, having a shaft portion 111 thereof bearing in the outer ends of links 112 and 113; the latter being pivoted on a pivot pin 114 which is mounted on an end of the heel section 73. The shaft 111 has a rigid extension 115 welded thereto projecting in right angled relation therefrom. It is pivoted to a pin 117 on an extension of the base 70. In operation as the lever 110 moves from the closed position shown in FIG. 13 to the opened position shown in FIG. 14, the links 112 and 113 move the heel section 73 along its arcuate path defined by surfaces 85 and 86 for the purpose of shortening the effective length of the last, either for the purpose of application of the upper or for removal of a shoe therefrom.

Figures 13, 14, 17:
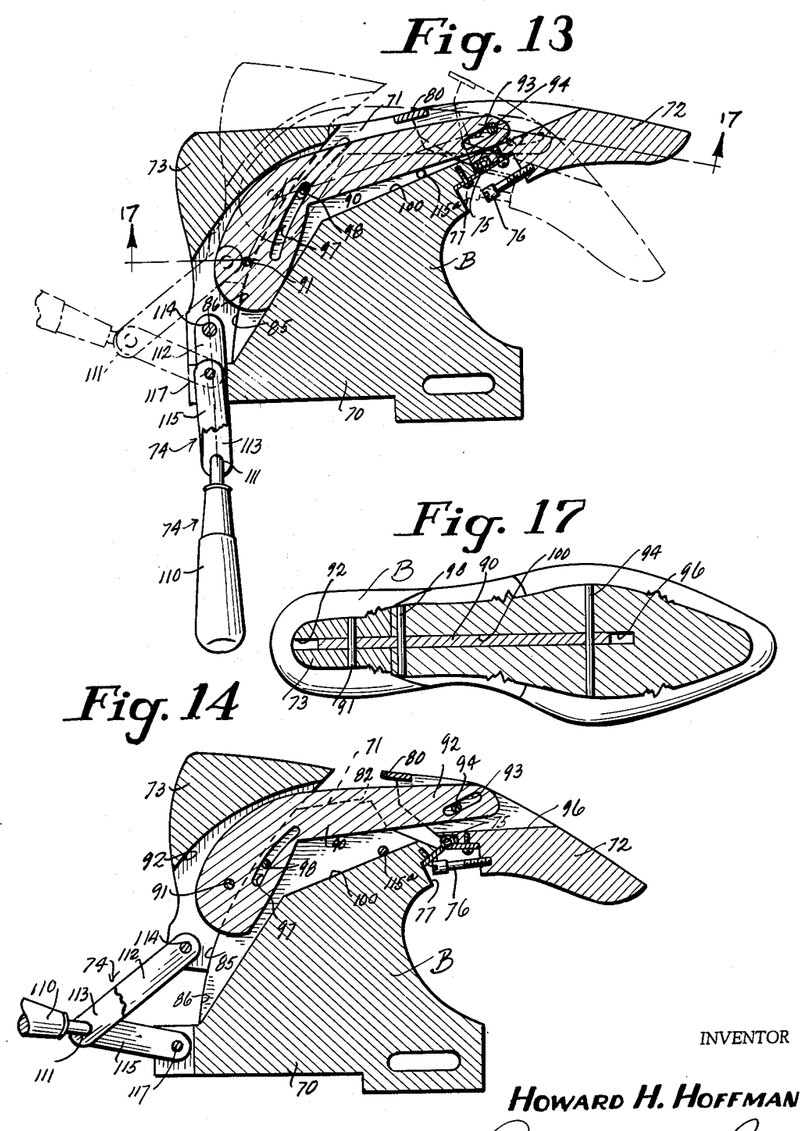
FIGURE 13 is a transverse cross sectional view taken through the closed last on a vertical plane and showing in dot and dash lines the opened position of the movable sections of the last.
FIGURE 14 is a cross sectional view of the last showing its sections in an intermediate opened relation.
FIGURE 17 is a cross sectional view taken through the last sections, substantially on the line 17—17 shown in FIG. 13.
Figure 18:
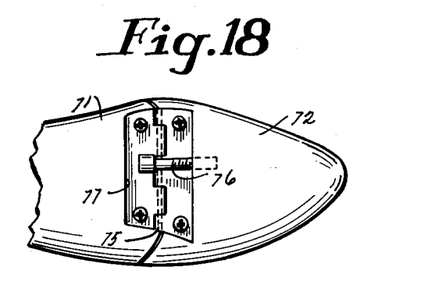
FIGURE 18 is a fragmentary view of the last showing the hinge section of the base and the toe section and looking in the direction shown by the line 18—18 in FIG. 11.

The last B is held in locked relation by the leverage mechanism 74 due to the face that the axis of the pin 117 lies off center with respect to a straight line drawn through the axes of pin 114 and shaft 111, as shown by the dot and dash line in FIG. 13. Thus, closed movement of the leverage mechanism 74 as shown in FIG. 13 will lock the last sections in closed position since the passing of the lever past the off center position requires that the links be tensioned to effect such movement. It is merely necessary to pull the lever 110 outwardly to move past dead center position in order to accomplish the arcuate sliding of the last heel section 73 as above described.

Figures 7, 9:
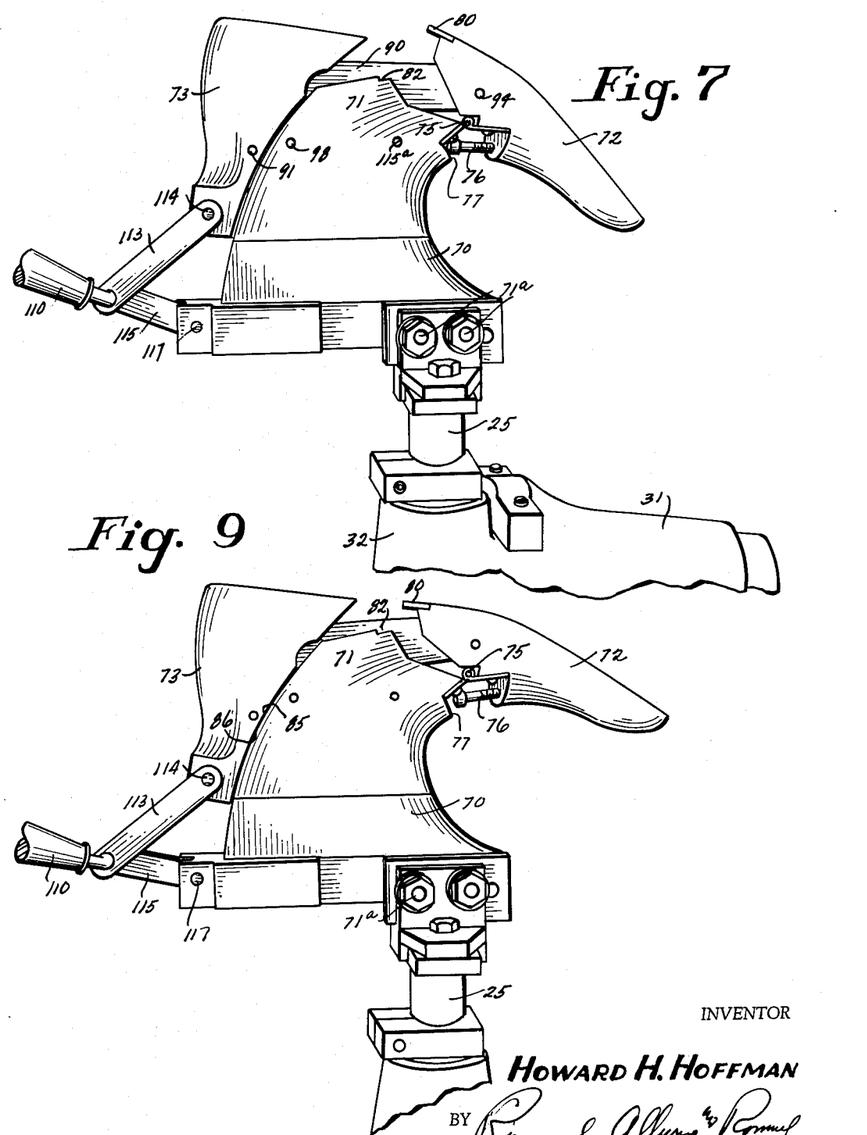
FIGURE 7 is a fragmentary sectional view showing the improved last with the parts thereof opened and in position to receive a shoe upper.
FIGURE 9 is a view showing the last sections in an intermediate opened position with the toe section closed to an appreciable extent compared to the last position of FIG. 7.
Figure 8:
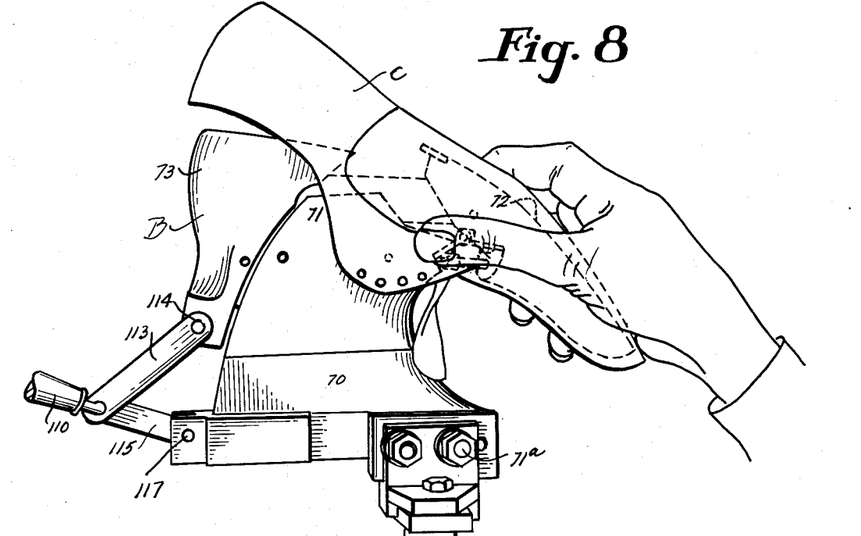
FIGURE 8 is a view similar to FIGS. 7, but showing an operator about to place a shoe upper upon the last while the latter is in opened position.
Figure 10:
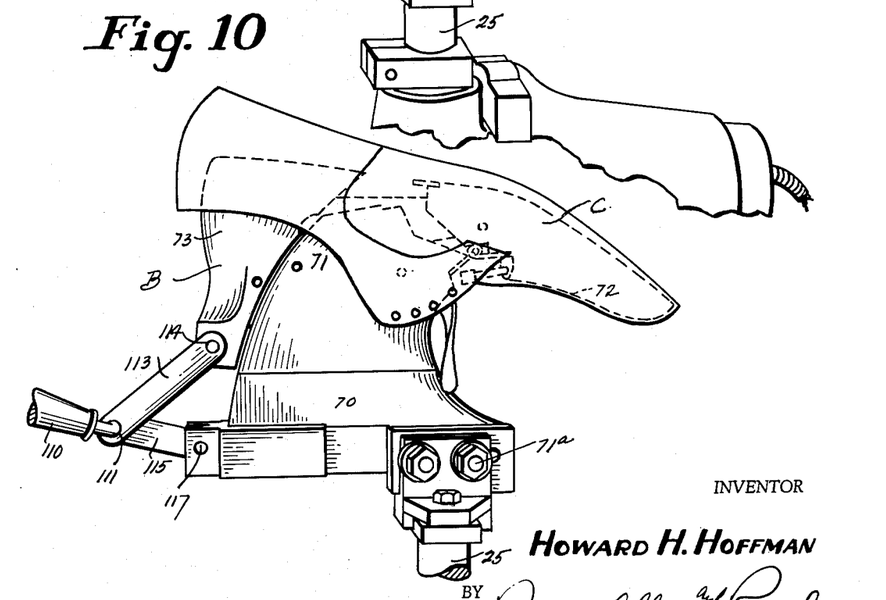
FIGURE 10 is a view showing the last with the sections thereof in the position shown in FIG. 9, but showing the relative association of the upper, in non-distorted relation therewith.
Figure 11:
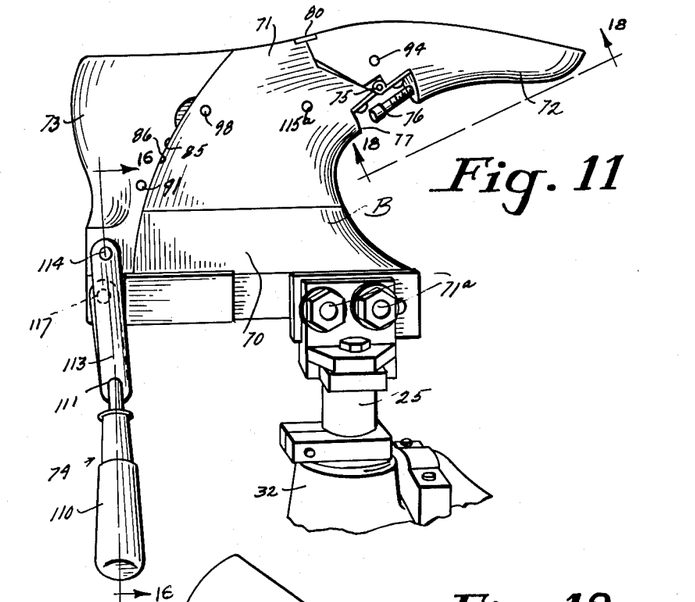
FIGURE 11 is a side elevation showing the improved last with its sections in closed position.

It will be noted that slot 97 accomplishes the purpose of riding on the pin 98 to insure that the heel section of the last will follow the cam or arcuate angle defined by surfaces 85 and 86. The front slot 93 has two purposes. First, it permits the front section 72 of the last to move naturally and freely with the action of the shoe as it is placed or removed with respect to the last. The slot 93 does not act to pull the toe portion down as the heel section is moved up during opening of the last. Action of the toe section 72 so as to prevent distortion of the shoe during application of the upper or removal of the shoe with respect to the last is effected through the semi rigid structure of the shoe itself. That is, resistance of the shoe and sole structure accomplishes movement of the toe section 72. Second, with the heel section 73 of the last in its uppermost position, as shown in FIG. 9 of the drawings, positions the slot 93 with respect to its pin 94 about as shown in FIG. 14. Thus, the toe section 72 is enabled, under manual influence of removal of the shoe as shown in FIG. 8, to pivot and move still farther in a downward position at its outer end in order that the rear of the shoe or upper may completely clear the last heel section 73. When the last heel section or block is lowered to grip the shoe upper, the slot 93 at its end engages the pin 94 to pull up the toe section or block and the last may then be clamped in its closed position without any bending or distortion of the shoe upper during this entire procedure. A hardened pin 115a is placed in the base 70 across the slot 100. The link 90 engages this hardened pin as the leverage 74 moves the last sections to closed position (see FIG. 13). Thus, all of the last parts are held in rigid closed position without any loose play whatsoever and with the shoe upper held in perfect alignment without distortion during its manipulation onto or off the last.

Various changes in the size, shape and arrangement of parts may be made to the form of invention herein shown and described, without departing from the spirit of the invention or scope of the claims.

I claim:

1. In a last construction the combination of a rigid base portion, an elongated last comprising a unitary heel block movably mounted on the base portion for movement transversely to the normal plane of the last, means for moving said heel block to opened and closed positions on the base, a toe block pivotally and tiltably mounted on said base for up and down movements transverse to the normal plane of the last, and linking means connecting the heel block to the toe block to enable free self-opening of the toe block upon the base when the heel block is opened and having means to effect closing of the toe block when the heel block is closed.

2. In a last construction for use upon shoe sole molding machines the combination of a base portion, an intermediate last block rigid with the base portion, a unitary toe section comprising a one-piece sole and instep portion pivotally connected to said base at the fore end of the intermediate block, a unitary heel block slidably and pivotally connected to said base and intermediate block at the rear end of the intermediate block, said unitary toe block being pivoted to the base on a horizontal transverse axis, the heel block being slidably and pivotally mounted for movement transverse to the normal plane of the sole of the last, operating means connected to the base and the heel block for moving the heel block to opened and closed positions with respect to the intermediate block, and a link pivotally connected to said heel block having means slidably and pivotally connected to said toe block for opening and closing the toe block.

3. A last as defined in claim 2 in which the last mentioned means comprises a slot on the link and the toe block has a pin fixedly mounted thereon riding in said mentioned slot, the last mentioned slot being angled so that as the heel block is partially opened said slot will be moved to decrease the angle of said slot and permit the toe block to gravity drop by the riding of said pin along said slot.

4. A last structure as defined in claim 2 in which the link is provided with rear slot and the base is provided with a transverse fixed pin thereon riding in said slot last mentioned following the general path of movement of the heel block when opening and closing to insure that the heel block of the last will follow a definite path of movement between opened and closed positions.

5. In a last construction for use upon sole molding machines the combination of a base including a short intermediate last block, a heel block arcuately slidable on the base and intermediate last block at the rear end of the intermediate last block and movable in an up and down direction transverse to the normal sole plane of the last, operating means for opening and closing the heel block with respect to said intermediate block and base, a unitary toe block horizontally pivoted on said base for up and down movement comprising the entire toe portion of the last including sole and instep, a link pivotally mounted on said heel block having means thereon and upon the base for insuring that the heel block will move along said arcuate path, said link extending into the toe block and there being provided with a slot, said toe block having a fixed pin riding in said slot to lift the toe block to a closed position as the heel block is moved to a closed position, and said slot being positioned so as to enable the toe block to freely move to an opened position as the heel block is being opened.

6. In a last construction for molding machines the combination of a base, a supporting shaft mounted on the base portion and rigidly connected therewith, a short intermediate block rigid with the base portion, a unitary toe block pivotally mounted on said base for up and down movement and comprising the entire fore portion of said last in complementary position with respect to said intermediate block, a heel block movably connected to said base for up and down movement and comprising the entire heel portion of said last in complementary relation to said intermediate block and toe block portions, operating means connected to said base and to said heel block for moving the heel block into opened and closed relation with respect to the intermediate block in an up and down direction transverse to the normal sole plane of the last, a link pivotally connected to said heel block recessed within the base and intermediate block, having a slotted fore portion recessed into the rear portion of the toe block, and a pin mounted on the toe block sliding in the slot of said link, said slot being angled so that as the heel portion is opened it will enable the toe portion to freely drop on its pivot axis and as the heel portion is closed the slot will ride on said pin to lift the toe portion to a closed relation upon said last.

7. A last adapted to be used upon molding machines and the like comprising a supporting base, a heel block slidably mounted on the base in a path of movement so that when the heel block is opened upon the base the normal last length will be shortened, a toe block pivotally mounted upon said base, a link pivotally connecting the toe block at its rear portion with the heel block, an operating leverage connecting the heel block to the base so that the heel block may be opened and closed with respect to the base, the link because of its connections with the heel block and toe block effecting closing movement of the toe block when the heel block is closed, a pin mounted upon the base, the link being provided with an arcuate slot receiving said pin to control the line of movement of the heel block upon said base between opening and closing movements and vice versa, said link being provided with a front slot, and a pin rigid with the toe block riding in said front slot to control opening and closing movements of the toe block.

References Cited by the Examiner

UNITED STATES PATENTS

| 245,303 | 8/81 | McKay | 12—135 |
|---|---|---|---|
| 449,877 | 4/91 | Gordon | 12—135 |
| 872,525 | 12/07 | Loewer. | |
| 1,349,796 | 8/20 | Wilhelmi. | |
| 1,496,091 | 6/24 | May | 12—135 |
| 1,933,098 | 10/33 | Dennett | 12—135 |
| 2,566,686 | 9/51 | Vlcek | 18—46 |
| 2,922,191 | 1/60 | Barton | 18—17 |
| 2,932,064 | 4/60 | Farmer et al. | 18—46 |
| 3,018,517 | 1/62 | Ludwig | 18—17 |
| 3,068,524 | 12/62 | Klee | 18—46 |

J. SPENCER OVERHOLSER, *Primary Examiner.*

MICHAEL V. BRINDISI, WILLIAM J. STEPHENSON,
*Examiners.*